(12) United States Patent
Weidl et al.

(10) Patent No.: US 9,326,562 B2
(45) Date of Patent: May 3, 2016

(54) OUTSOLE AND SPORTS SHOE

(71) Applicant: adidas AG, Herzogenaurach (DE)

(72) Inventors: Juergen Weidl, Aurachtal (DE); Bruno Jean Antonelli, Herzogenaurach (DE); Harald Geyer, Lonnerstadt (DE)

(73) Assignee: adidas AG, Herzogenaurach (DE)

( * ) Notice: Subject to any disclaimer, the term of this patent is extended or adjusted under 35 U.S.C. 154(b) by 300 days.

(21) Appl. No.: 14/057,908

(22) Filed: Oct. 18, 2013

(65) Prior Publication Data

US 2014/0059896 A1 Mar. 6, 2014

Related U.S. Application Data

(63) Continuation of application No. 12/858,219, filed on Aug. 17, 2010, now Pat. No. 8,584,378.

(30) Foreign Application Priority Data

Aug. 18, 2009 (DE) .......................... 10 2009 028 627

(51) Int. Cl.
*A43B 13/42* (2006.01)
*A43B 5/02* (2006.01)
(Continued)

(52) U.S. Cl.
CPC .................. *A43B 5/02* (2013.01); *A43B 1/0009* (2013.01); *A43B 1/0072* (2013.01); *A43B 7/1495* (2013.01); *A43B 13/026* (2013.01); *A43B 13/12* (2013.01); *A43B 13/41* (2013.01);
(Continued)

(58) Field of Classification Search
CPC .... A43B 13/12; A43B 13/122; A43B 13/125; A43B 13/14; A43B 13/42

USPC ............... 36/25 R, 30 R, 30 A, 31, 76 R, 107
See application file for complete search history.

(56) References Cited

U.S. PATENT DOCUMENTS 1,258,629 A      3/1918 Bliss
2,342,466 A  *   2/1944 Gordon .................. A43B 23/22
                                                    36/76 R
(Continued)

FOREIGN PATENT DOCUMENTS

CN         1320067 A      10/2001
CN         1947610 A       4/2007
(Continued)

OTHER PUBLICATIONS

European Search Report for Application No. 10173236.0, Munich, Germany, dated Aug. 5, 2014, 12 pages.
(Continued)

*Primary Examiner* — Marie Bays
(74) *Attorney, Agent, or Firm* — Sterne, Kessler, Goldstein & Fox, P.L.L.C.

(57) ABSTRACT

The present invention relates to an outsole for a shoe, the outsole including a sole plate, extending from a heel part, via a midfoot part, into a forefoot part of the outsole, at least one first reinforcing rib integrated into the sole plate, and a reinforcing plate disposed above or below the at least one first reinforcing rib. The present invention also relates to a shoe, including a shoe upper including a closure region and a sole region, and at least one reinforcing element attached to the inside of the shoe upper, arranged in a midfoot part of the shoe upper, and including a plurality of flexible bands extending between the closure region and the sole region.

22 Claims, 6 Drawing Sheets

(51) Int. Cl.
*A43B 13/12* (2006.01)
*A43B 1/00* (2006.01)
*A43B 7/14* (2006.01)
*A43B 13/02* (2006.01)
*A43B 13/41* (2006.01)
*A43B 23/02* (2006.01)
*B29C 65/16* (2006.01)
*B29L 31/50* (2006.01)
*B29L 31/52* (2006.01)
*B29C 65/08* (2006.01)
*B29C 65/48* (2006.01)
*B29C 65/00* (2006.01)

(52) U.S. Cl.
CPC ............ *A43B 13/42* (2013.01); *A43B 23/0235* (2013.01); *A43B 23/0265* (2013.01); *B29C 65/08* (2013.01); *B29C 65/1635* (2013.01); *B29C 65/48* (2013.01); *B29C 66/1122* (2013.01); *B29C 66/472* (2013.01); *B29C 66/71* (2013.01); *B29C 66/721* (2013.01); *B29L 2031/50* (2013.01); *B29L 2031/52* (2013.01)

(56) References Cited

U.S. PATENT DOCUMENTS

| | | | | |
|---|---|---|---|---|
| 2,362,497 | A | 11/1944 | Moore | |
| 2,403,950 | A | 7/1946 | Nathan | |
| 2,442,007 | A * | 5/1948 | Johnson | A43B 23/22 36/76 HH |
| 2,583,302 | A * | 1/1952 | Musebeck | A43B 9/06 36/76 R |
| 2,614,342 | A * | 10/1952 | Hoza | A43B 13/181 36/14 |
| 3,205,595 | A | 9/1965 | Funck | |
| 3,333,353 | A * | 8/1967 | Garcia | A43B 23/22 36/154 |
| 3,481,820 | A | 12/1969 | Jonas | |
| 4,020,569 | A | 5/1977 | Fukuoka | |
| 4,245,406 | A | 1/1981 | Landay et al. | |
| 4,404,757 | A * | 9/1983 | Sweeny | A43B 23/22 36/107 |
| 4,439,937 | A * | 4/1984 | Daswick | A43B 13/10 36/107 |
| 4,447,967 | A | 5/1984 | Zaino | |
| 4,594,799 | A | 6/1986 | Lin | |
| 4,663,865 | A | 5/1987 | Telecemian | |
| 4,733,483 | A | 3/1988 | Lin | |
| 4,813,158 | A | 3/1989 | Brown | |
| 4,845,863 | A | 7/1989 | Yung-Mao | |
| 5,222,311 | A | 6/1993 | Lin | |
| 5,452,526 | A * | 9/1995 | Collins | A43B 1/0072 36/108 |
| 5,469,639 | A | 11/1995 | Sessa | |
| 5,542,195 | A | 8/1996 | Sessa | |
| 5,619,809 | A | 4/1997 | Sessa | |
| 5,720,117 | A * | 2/1998 | Toschi | A43B 23/22 36/169 |
| 5,950,335 | A | 9/1999 | Okajima | |
| 6,041,525 | A * | 3/2000 | Kelley | A43B 1/0027 36/107 |
| 6,065,229 | A | 5/2000 | Wahrheit | |
| 6,467,198 | B1 * | 10/2002 | James | A43B 1/10 36/115 |
| 6,701,644 | B2 | 3/2004 | Oorei et al. | |
| 6,925,734 | B1 | 8/2005 | Schaeffer | |
| 7,380,353 | B2 | 6/2008 | Feller et al. | |
| 7,540,097 | B2 | 6/2009 | Greene et al. | |
| 2001/0005948 | A1 | 7/2001 | Pellegrini et al. | |
| 2002/0148142 | A1 | 10/2002 | Oorei et al. | |
| 2003/0079376 | A1 | 5/2003 | Oorei et al. | |
| 2004/0056006 | A1 | 3/2004 | Jones | |
| 2004/0148800 | A1 | 8/2004 | Nakano | |
| 2005/0108898 | A1 * | 5/2005 | Jeppesen | A43B 1/0072 36/30 R |
| 2006/0117606 | A1 | 6/2006 | Chen et al. | |
| 2007/0017122 | A1 | 1/2007 | Feller | |
| 2007/0271823 | A1 | 11/2007 | Meschter | |
| 2008/0110048 | A1 | 5/2008 | Dua | |
| 2009/0019729 | A1 | 1/2009 | Nakano | |
| 2009/0064535 | A1 | 3/2009 | Spanks et al. | |
| 2009/0071036 | A1 | 3/2009 | Hooper et al. | |
| 2009/0090027 | A1 | 4/2009 | Baudouin | |
| 2009/0300943 | A1 | 12/2009 | Hsieh | |
| 2012/0180343 | A1 * | 7/2012 | Auger | A43B 5/02 36/30 R |

FOREIGN PATENT DOCUMENTS

| | | |
|---|---|---|
| DE | 7 819 461 U1 | 10/1978 |
| DE | 20 2006 009 950 U1 | 11/2007 |
| DE | 20 2005 021 682 U1 | 5/2009 |
| EP | 0 278 031 A1 | 8/1988 |
| JP | S5952903 U | 4/1984 |
| JP | 2000201703 A | 7/2000 |
| JP | 200146107 A | 2/2001 |
| WO | 0020157 A1 | 4/2000 |

OTHER PUBLICATIONS

Translation of German Office Action in German Application No. 10 2009 028627.6, dated May 11, 2010, 3 pages.
First Office Action for Chinese Appl. No. 201410602825.0, mailed Aug. 31, 2015, 8 pages.

* cited by examiner

OUTSOLE AND SPORTS SHOE

CROSS-REFERENCE TO RELATED APPLICATION

This application is a continuation of U.S. application Ser. No. 12/858,219, filed Aug. 17, 2010, which is incorporated herein in its entirety by reference thereto.

BACKGROUND OF THE INVENTION

1. Field of the Invention

The present invention relates to an outsole for a sports shoe and to a sports shoe including such an outsole, in particular a soccer shoe.

2. Background

In many sports, acceleration influences the performance of an athlete. For example, in the case of a sprinter, it is not only the ultimate achievable speed that influences victory or defeat, but also how quickly this speed is reached. Acceleration is even more important in sports in which frequent changes of direction are common. In particular for soccer, but also for other field sports, athletes frequently accelerate when, for example, they change direction while running or jump suddenly.

According to the laws of physics, acceleration directly depends on the mass to be moved. It is therefore an important objective in the design of sport shoes, in particular soccer shoes, to reduce the overall weight as much as possible in order to increase the acceleration at a given force. Presently, the lightest available soccer shoes have a weight of greater than 165 grams. Even such a weight, which might seem minor, may impair a player's agility, e.g., during fast dribbling with a soccer ball. Furthermore, the inertial mass of the soccer shoe may reduce the velocity of the player's leg when kicking the ball and thus reduce the speed of the kicked ball. Also, the inertial mass of the soccer shoe at the player's legs may affect the fatigue of the player. The larger the mass that exerts leverage forces and torques on the body due to its positioning at the lower extremities, the faster the player may fatigue during the 90 minutes (or more) of a soccer match.

A number of conventional approaches attempt to reduce the weight of a shoe. US Patent Application Publication No. 2009/0071036, published Mar. 19, 2009, for example, discloses the use of carbon fibers in the upper part of a shoe. US Patent Application Publication No. 2007/0271823, published Nov. 29, 2007, for example, discloses an upper wherein a thin material layer is reinforced by a plurality of threads arranged on its outside. U.S. Pat. No. 4,813,158, issued Mar. 21, 1989, for example, discloses a lightweight sports shoe having reinforcement in the transition area between midfoot and forefoot so that the shoe is capable of withstanding loads in spite of the thin and lightweight materials of the upper. U.S. Pat. No. 7,540,097 B2, issued Jun. 2, 2009, for example, discloses a shoe construction wherein the upper comprises a dense matrix structure of repeatedly intersecting segments. The upper itself may be arranged within the matrix structure so that the segments are arranged on the outside of the upper.

Apart from addressing the upper of the shoe, some conventional approaches also modify the sole structure, since the sole of the shoe has an influence on the overall weight of the shoe. The US Patent Application Publication No. 2009/0064535, published Mar. 12, 2009, for example, discloses a sole assembly wherein a plate made from a composite material is glued to a cut-out of a sole.

None of the above-described approaches, however, substantially reduce the weight of a sports shoe without deteriorating its functional properties (e.g., traction on the ground, support for the foot, and wearing comfort) or without substantially increasing manufacturing complexity and/or cost.

The present invention at least partly overcomes the disadvantages of known shoe constructions by providing an outsole and a sports shoe that may have substantially reduced weight compared to conventional outsoles and sports shoes but that may maintain stability, wearing comfort, and/or traction, and/or that can be affordably manufactured.

BRIEF SUMMARY OF THE INVENTION

Exemplary embodiments of the present invention provide an outsole having a weight significantly below the weight of conventional outsoles without impairing functional properties of the outsole.

Exemplary embodiments of the present invention also provide a sports shoe having a weight significantly below the weight of a conventional sports shoe (for example, 126 grams) without impairing functional properties of the sports shoe.

A substantial reduction of the weight of an outsole or sports shoe according to exemplary embodiments of the present invention can be achieved without requiring realization of all features disclosed herein (e.g., if only some of the features disclosed herein are realized). The present disclosure therefore provides a kind of toolbox of technical features that can be combined by a person skilled in the art in order to reduce the weight of a sports shoe.

An outsole according to an exemplary embodiment of the present invention includes an integral sole plate extending from a heel part via a midfoot part into a forefoot part of the outsole. At least one first reinforcing rib is integrated into the sole plate and a reinforcing plate is arranged above or below the at least one reinforcing rib.

In one embodiment, the integral outsole extends essentially over the complete length of the shoe and includes one or more reinforcing ribs that can be cost-efficiently manufactured by injection-molding of a lightweight but highly-stable plastic material. The reinforcing ribs are preferably arranged in the midfoot part and provide a selective stiffening of this sole region for supporting the arch of the foot. They can be arranged above or below the sole plate (or may even replace the sole plate in some areas). The reinforcing ribs result in a specific stiffening of the sole and may have for this purpose suitable forms and profiles, for example a T-like profile. A cavity is arranged between the sole plate and the at least one reinforcing rib. Thus the sole plate can be formed thinner in this area, which results in a significant reduction of weight.

Besides a further stiffening of the outsole at the side directed to the foot, the reinforcing plate, which is arranged on top of the at least one reinforcing rib, provides the possibility to have an essentially smooth surface on the side directed to the foot. As a result, a foot of an athlete can directly rest on the outsole without uncomfortable pressure loads on the sole of the foot. In a reverse arrangement in which the reinforcing plate is arranged below the reinforcing rib, the area of the sole plate, which is formed thinner, can seamlessly attach to other areas of the sole plate at the inside of the outsole directed to the foot so that also in this case a smooth area of support can be formed. A multi-layered sole configuration and corresponding weight can therefore be essentially omitted. The addition of a thin insole is possible to improve the wearing comfort at the smallest possible increase of weight.

The reinforcing plate may be made from a material transparent to a laser beam, thereby allowing interconnection to the integral sole plate by laser welding. A laser beam passes through the reinforcing plate and creates localized heating and thus melting of the material of the sole plate. Alternatively, the sole plate can be fabricated from a material transparent to a laser beam and the reinforcing plate from an intransparent material so that at the incidence of the laser light the reinforcing plate is selectively melted. Compared to using an adhesive to connect sole parts, in some embodiments laser welding does not result in an increase in weight. Similar advantages can also be obtained, for example, by ultrasonic welding.

The at least one reinforcing rib may have a thickness (i.e., height and/or a width) of less than or equal to about 8 mm, and, in one embodiment, preferably less than or equal to about 3 mm. Modern plastic materials (e.g., a fiber reinforced polyamide (PA12)) can provide the required stiffness in the midfoot area and in other parts of the outsole even if small dimensions are used (leading only to a very minor increase of weight).

In one exemplary embodiment, at least two first reinforcing ribs of the integral sole plate extend essentially in a longitudinal direction of the shoe. Preferably, there is at least one further first reinforcing rib which extends essentially transversely over the midfoot part of the shoe. As a result, a framework is provided, stiffening the integral sole plate in the area of the arch of the foot against both a bending in longitudinal direction as well as a bending in a transversal direction. If the reinforcing plate includes at the side directed to the sole plate at least one second reinforcing rib, which is at least partially parallel to the at least one first reinforcing rib, a midfoot part is created having a maximal bending stiffness at the lowest weight.

If the outsole is to be used for track and field sports or the like, it may include a plurality of profile elements formed in the integral sole plate. Such profile elements are typically separately manufactured and subsequently anchored to corresponding receptacles of the sole. An exemplary embodiment of the invention omits the weight of such receptacles by integrally manufacturing the profile elements together with the sole plate. Furthermore, the profile elements may not be solid but may include hollow cavities, thereby further reducing the weight of the shoe.

In order to improve its functional properties, if the integral sole plate is made of a first material, at least one of the profile elements may include a portion made of a second material (e.g., a somewhat softer TPU (thermoplastic urethane)) on the side directed to the ground to provide some cushioning when walking on the profile elements. It is also possible to use a harder material (e.g., if the shoe is to be used on hard and dry grounds). Together with the sole plate the portion made from a second material can be efficiently manufactured by multi-component injection molding. It is also possible to extrusion-coat the portion made in a first manufacturing step with the surrounding sole material.

In the heel part, the integral sole plate may include a heel cup having a side portion made from a third, softer material (e.g., TPU). The side portion can also be manufactured together with the rest of the sole plate using multi-component injection-molding. Such a heel cup supports the foot from the sides and the rear and may enable, together with the profile elements, a fast acceleration of a wearer. The lateral parts can be injection-molded from the softer material so that there is no need for complex and heavy cushioning in the heel part of the upper. This is a further measure to reduce the overall weight of the sports shoe without impairing its functional properties.

A further exemplary embodiment of the invention is directed to a sports shoe (e.g., a soccer shoe) including a shoe upper having a closure region and a sole region. A reinforcing element is attached to the inside of the shoe upper encompassing all of the midfoot and including a plurality of elastic bands extending from the closure region to the sole region.

The described arrangement of the plurality of bands in the midfoot part between the closure region and the midfoot region reinforces the upper of the shoe and allows a firm attachment of the upper to the foot with the sole being arranged underneath. In doing so, it is not necessary that the bands extend across the complete distance between the closure region and the sole region. It is sufficient if the material of the shoe upper is sufficiently reinforced by the bands arranged in the midfoot part.

Preferably, the reinforcing element includes bands that are arranged on both the medial and the lateral inside of the shoe upper, wherein the bands on the medial inside of the shoe upper are preferably formed more flexibly than on the lateral inside of the shoe upper. For this reason, on the one hand, the stability of the shoe is improved with respect to lateral loads, for example at sudden changes of direction, and, on the other hand, the flexibility of the shoe upper is maintained, which enables for a soccer shoe a smooth rolling-off and a precise feel for a ball. In other embodiments, bands may be arranged on either the medial or lateral inside of the shoe upper.

For the mentioned stability and flexibility of the shoe, it is preferred if the bands at the lateral inside of the shoe upper are not flexible under the loads occurring generally in a sports shoe and the bands at the medial side of the shoe upper have less intersections among each other than the bands on the lateral side of the shoe upper. The more intersections or crosslinkings the bands have among each other, the more stable the shoe upper will be, but the less flexible it may be, so that, for example for a soccer shoe, the bands at the medial side may not have any intersections at all. Such an open structure of the bands enables the shoe upper to be stretched in a direction transverse to the bands (i.e., essentially in the longitudinal direction of the shoe) which is beneficial, for example, for an unhindered rolling-off of the forefoot part.

The materials for the shoe upper can be particularly lightweight, such as a textile material having a TPU coating or a (carbon) fiber reinforced composite material, since tensile forces within the upper of the shoe are sustained by the described bands. The flat bands of the reinforcing elements are arranged on the inside of the upper of the shoe without impairing the wearing comfort. The reinforcing element may be made of a material having a thickness of less than about 1.5 mm, preferably less than 0.3 mm. Each band preferably has a width between 0.5 cm and 2 cm. These dimensions allow the manufacturing of the essentially non-yielding bands from a plurality of materials such as a lightweight, reinforced PET (polyethylene terephthalate) as it is used for windsurf sails. To improve the wearing comfort, the PET can be extrusion-coated with foamed polyurethane (PU).

Since the reinforcing element is arranged on the inside of the upper of the shoe, the outside of the shoe can meet other requirements without being hindered by the reinforcing element (e.g., for an optimized ball contact, if the sports shoe is a soccer shoe).

In case of a soccer shoe, it is further preferred in an embodiment that the reinforcing element includes a reinforcing area to reinforce a ball contact surface of the upper of the shoe, wherein the reinforcing area is integrally manufactured together with the plurality of bands. In one embodiment, the reinforcing area may be arranged on the medial side of the upper of the shoe where most of the ball contacts are expected to occur. The reinforcing area can extend over the forefoot part and may include a foamed material that cushions the arising loads on the foot during hard ball contacts. This feature may also contribute to a reduction of the weight of the shoe, since it allows the manufacture of the upper of the soccer shoe from a significantly thinner and lighter material.

In order to reduce weight, the reinforcing element may not encompass the forefoot part or the heel. In the forefoot part, contact with the ball may be desired as directly as possible (e.g., during dribbling or when shooting a ball with a spin). In the heel part, the bands are not necessary, since the shoe will already have the required stability (e.g., due to the use of the above described outsole and the integrated heel cup).

BRIEF DESCRIPTION OF THE FIGURES

The accompanying drawings, which are incorporated herein and form a part of the specification, illustrate the present invention by way of example, and not by way of limitation. The drawings together with the description, further serve to explain the principles of the invention and to enable a person skilled in the pertinent art to make and use the invention.

DETAILED DESCRIPTION OF THE INVENTION

In the following, exemplary embodiments of the present invention are further described with reference to a soccer shoe. Embodiments of the present invention can also be used for other articles of footwear, for example in sports shoes for other field sports (e.g., field hockey, rugby, or American football), for running sports (e.g., sprints or hurdle races), and/or for recreational sports. It is contemplated that embodiments of the present invention may be used for non-sports related articles of footwear, including, for example, sandals. The technical concepts for weight reduction of a shoe can be advantageously applied if a design goal is maintenance of high mechanical stability and biomechanical properties of the shoe combined with minimal weight.

It is not mandatory to combine all disclosed features that can contribute to reducing the weight. On the contrary, a person skilled in the art will understand that the features detailed below for reducing the weight of the shoe can be combined in various configurations in order to at least partially achieve advantages compared to conventional techniques.

Figure 1:
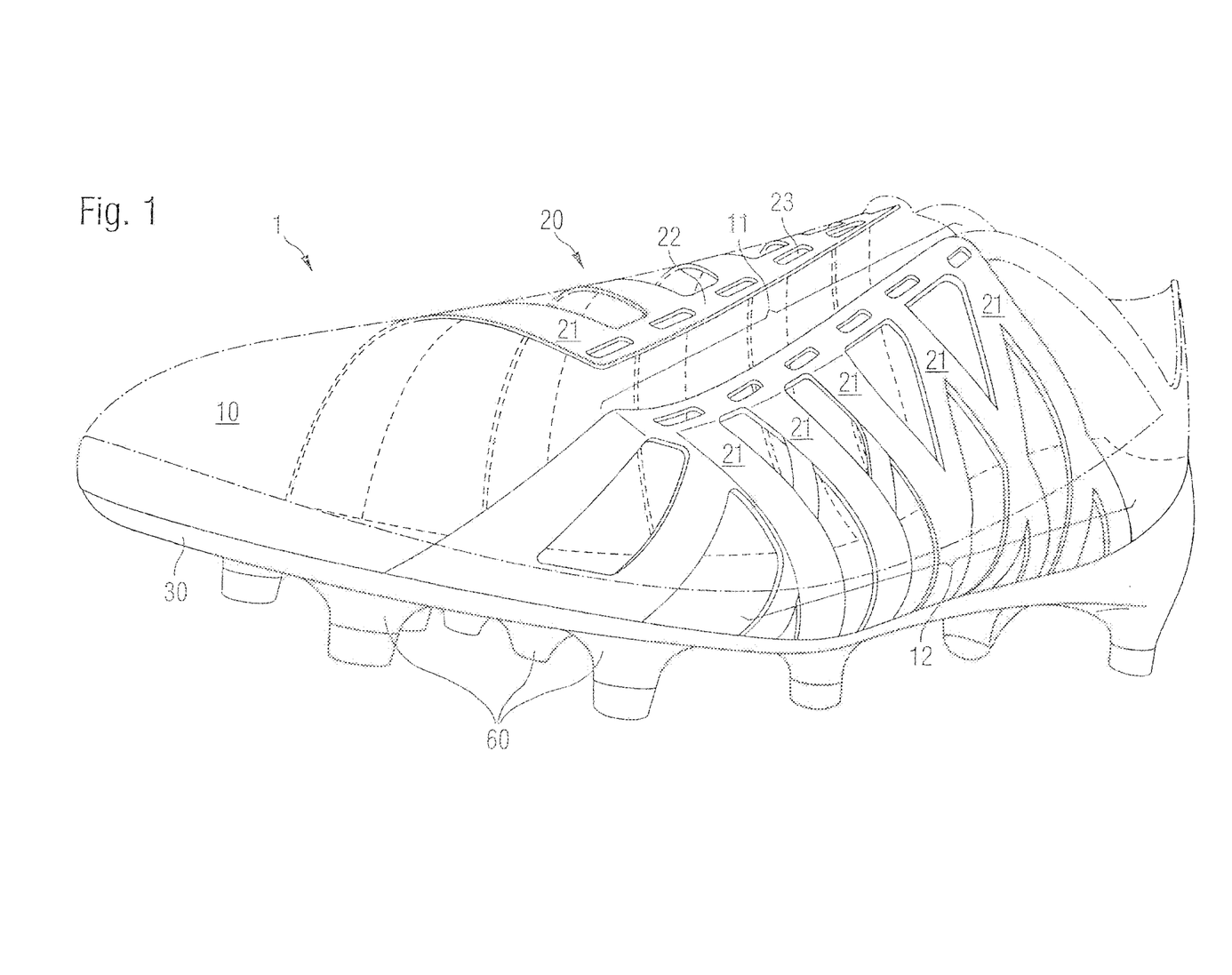
FIG. 1 is an inclined lateral front view of a sports shoe according to an exemplary embodiment of the present invention.
Figure 2:
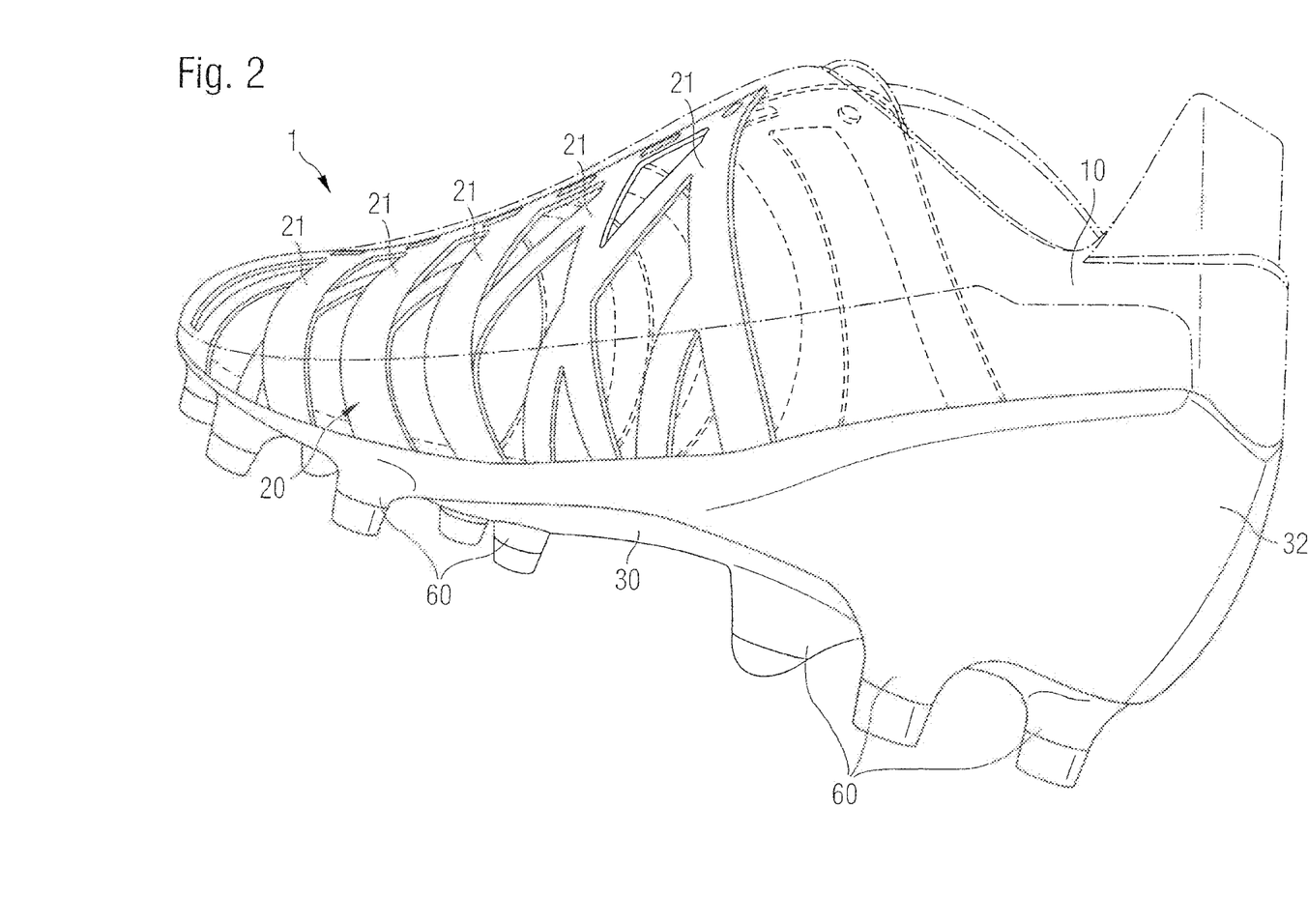
FIG. 2 is an inclined lateral rear view of the sports shoe of FIG. 1.

FIGS. 1 and 2 show an exemplary embodiment of a shoe 1 in an inclined lateral front view and an inclined lateral rear view, respectively. An upper 10 is shown in broken lines, with a frame-like reinforcing element 20 shown in solid lines arranged on the inside of upper 10. Various materials can be used for upper 10 that are both lightweight and have sufficient wear resistance. For example, textile materials such as a nylon mesh may be used. On the outside and/or the inside, such a textile material can be reinforced by a suitable coating such as a transparent thermoplastic polyurethane (TPU) layer (not shown in FIGS. 1 and 2). Such a layer may protect design elements, prints, labels, etc. arranged below the plastic layer on the outside of upper 10. Moreover, such a layer may prevent the penetration of moisture or humidity and therefore contribute to the wearing comfort and long life of the shoe. For improving ventilation, the coating as well as the material of upper 10 may, for example, be perforated or have larger ventilation slits (not shown).

Reinforcing element 20 is arranged on the inside of upper 10 as shown in FIGS. 1 and 2. Several bands 21 form a frame-like structure extending from a sole region 12 to a closure region 11 of shoe 1, and substantially encompass a midfoot (not shown) of a wearer of the shoe. Bands 21 have a small thickness (e.g., less than or equal to 1.5 mm or less than or equal to 0.3 mm) and can therefore be arranged on the inside of upper 10 without affecting the wearing comfort. For bands 21 on the medial and the lateral side, TPU foils may be used with a thickness of approximately 0.2 mm). In an exemplary embodiment, the hardness of the material used for TPU foils may be lower on the medial side (e.g., 80-85 Shore A) and/or may be higher on the lateral side (e.g., more than 90 Shore A, preferably 95 Shore A). Thus, bands 21, when placed in tension by the connection to the shoe upper 10, are less flexible on the lateral side under expected tensile loads than bands 21 on the medial side, which are more flexible. Thus, bands 21 do not noticeably impair the rolling-off and the feel for a ball at the contact with the inner instep of upper 10.

Figure 6:
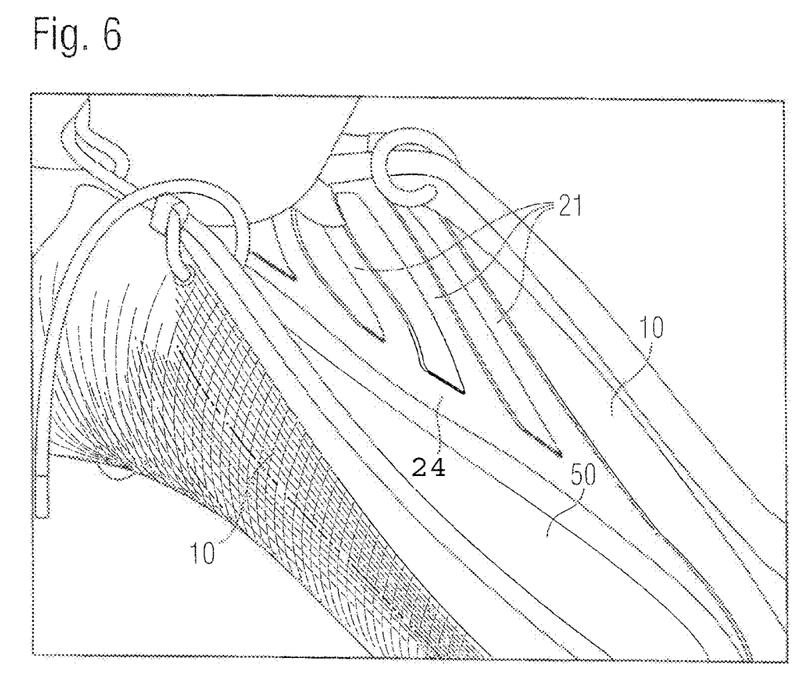
FIG. 6 is a detailed representation of an upper of a shoe and a reinforcing element according to an exemplary embodiment of the present invention.

The arrangement of bands 21 of reinforcing element 20 determines the deformation properties of upper 10 of shoe 1 and thereby the stability that shoe 1 provides for a foot during ground contact. FIG. 6 shows an embodiment wherein bands 21 extend substantially parallel to each other from closure region 11 at the laces to sole region 12. Such arrangement of bands 21 as well as the cross-linked arrangement of the bands 21 shown in the exemplary embodiment of FIGS. 1 and 2 ensures that an outsole 30 is securely attached from below to the sole of the foot and the foot does not slide back and forth on outsole 30 when the laces of shoe 1 and closure region 11 are tightened (or when other means for closing the shoes that are not shown such as VELCRO® bands are used).

The lesser the amount of cross-linking between bands 21, however, the lower the resistance of reinforcing elements 20 against a flexing of upper 10 (e.g. during rolling-off). Upper 10 as shown in FIG. 6 has bands 21 without any intersection and thus provides a lower resistance against such a flexing. In the exemplary embodiment of FIG. 1 or 2 each band 21 on the lateral side of upper 10 intersects with up to two other bands 21 or is cross-linked with them in a different manner, whereas bands 21 on the medial side are substantially parallel to each other so that the lateral side is more stable and the medial side is more flexible.

Depending on the field of use of shoe 1, a person skilled in the art may select on the medial and/or the lateral side of upper 10 an appropriate amount of cross-linking of bands 21. For example, a sports shoe for strong and frequent lateral loads may have a reinforcing element 20 with more cross-linked bands 21 than a sprint shoe, since lateral loads make higher demands to the lateral stability of a shoe than linear loads.

For reliably transmitting the tension forces caused by the closure system to bands 21, an upper band 22 of reinforcing element 20 may be arranged along the edge of closure region 11, as shown in FIG. 1. Openings 23 for laces may be integrated into upper band 22 or other closure devices (not shown) may be attached to upper band 22. Upper band 22 distributes a load onto several bands 21, so that high forces can be sustained by reinforcing element 20 in case of a tight lacing. In a similar manner, bands 21 can also be interconnected at the lower end by a lower band 24 extending along an edge of the sole region (see FIG. 6).

Figure 9:
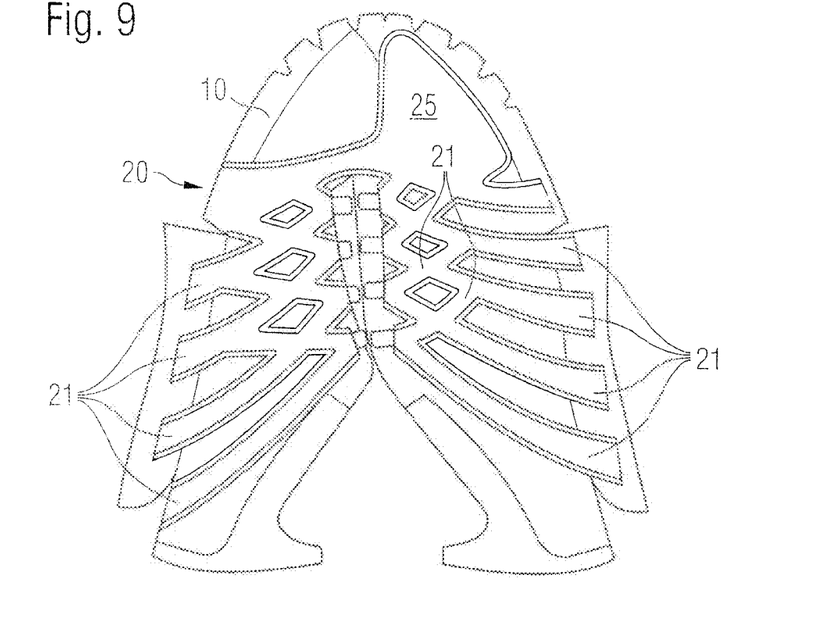
FIG. 9 is a view of a planar spread reinforcing element for a shoe upper having an integrated reinforcing area, according to an exemplary embodiment of the present invention.

FIG. 9 shows an exemplary embodiment of upper 10 and the corresponding reinforcing element 20 in a planar representation prior to the assembly of shoe 1. Each band 21 intersects up to two other bands 21 before reaching a position corresponding to closure region 11 (the inner part of FIG. 9) of shoe 1 starting from a position corresponding to sole region 12 (the outer part in FIG. 9).

The intersections of bands 21 are, in this exemplary embodiment, arranged in the upper part of reinforcing element 20 (i.e., adjacent to a position corresponding to closure region 11) in order to not impair flexing of upper 10 in its lower part (e.g., during rolling-off).

The exemplary embodiment of FIG. 9 further shows that reinforcing element 20 can be integrally manufactured including a medial and a lateral side. An additional reinforcing area 25 may be provided on the medial side in the forefoot region (e.g., in front of bands 21 that encompass the midfoot-part). Reinforcing area 25 further reinforces upper 10. Reinforcing area 25 may serve as a support of the material of the upper 10 in areas wherein frequent ball contact may be expected. This feature allows the manufacture of upper 10 from a thin and particularly lightweight material without impairing the wearing comfort or wear resistance.

Figure 10:
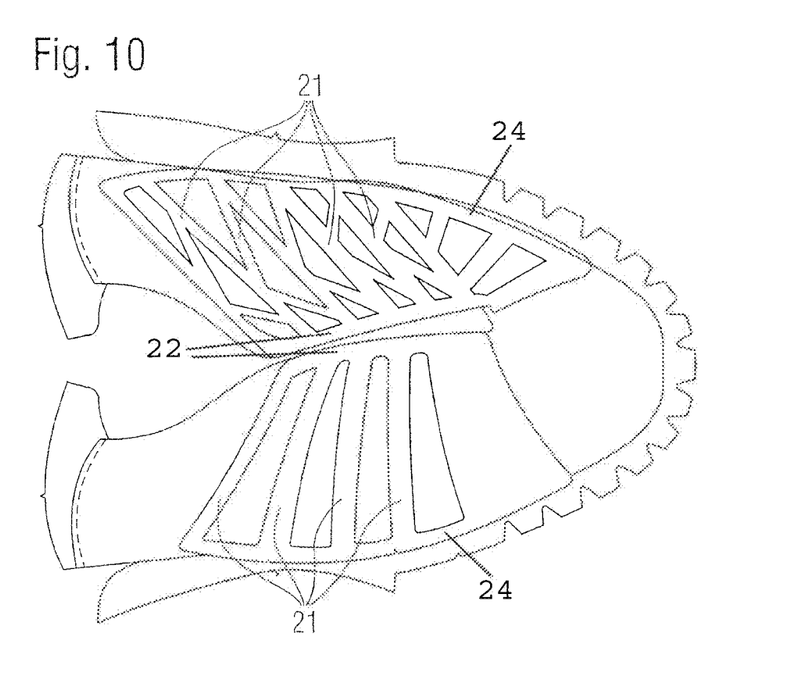
FIG. 10 is a view of a planar spread reinforcing element for a shoe upper according to an exemplary embodiment of the present invention.

FIG. 10 shows in top view an asymmetric arrangement of bands 21 of reinforcing element 20 on the medial and the lateral side of upper 10, in accordance with an exemplary embodiment of the present invention. Bands 21 on the lateral side intersect several times or are cross-linked with each other, whereas bands 21 on the medial side extend separately from each other. Not all bands 21 must have identical dimensions, but each can be individually adjusted according to its respective position in reinforcing element 20. Additionally, more bands 21 are arranged on the lateral side than on the medial side. Each of the mentioned differences of the set-up of the reinforcing element on the medial and the lateral side independently contributes to a desired asymmetric expansion behaviour of shoe 1 in the forefoot part.

In the case of a soccer shoe, the forefoot area of the shoe can be further optimized, for example by arranging a thin leather material covering the forefoot part from the outside (not shown) or by arranging elements on upper 10 to provide an improved grip on the ball (not shown).

In addition to being positioned on the inside of upper 10, as shown in FIGS. 1, 2, and 6, reinforcing element 20 can, in some exemplary embodiments, also be arranged on the outside of upper 10 (not shown). In contrast to known reinforcing structures on the outside of an upper of a sports shoe, flat bands 21 do not significantly influence the other properties of the shoe (e.g., the shooting properties when contacting a ball, in the case of a soccer shoe). Further, in some exemplary embodiments reinforcing element 20 may be integrated between two layers of a thin and lightweight material of upper 10 (not shown). Additionally or alternatively, in some exemplary embodiments reinforcing element 20 could be extrusion-coated with a further material.

Figure 3:
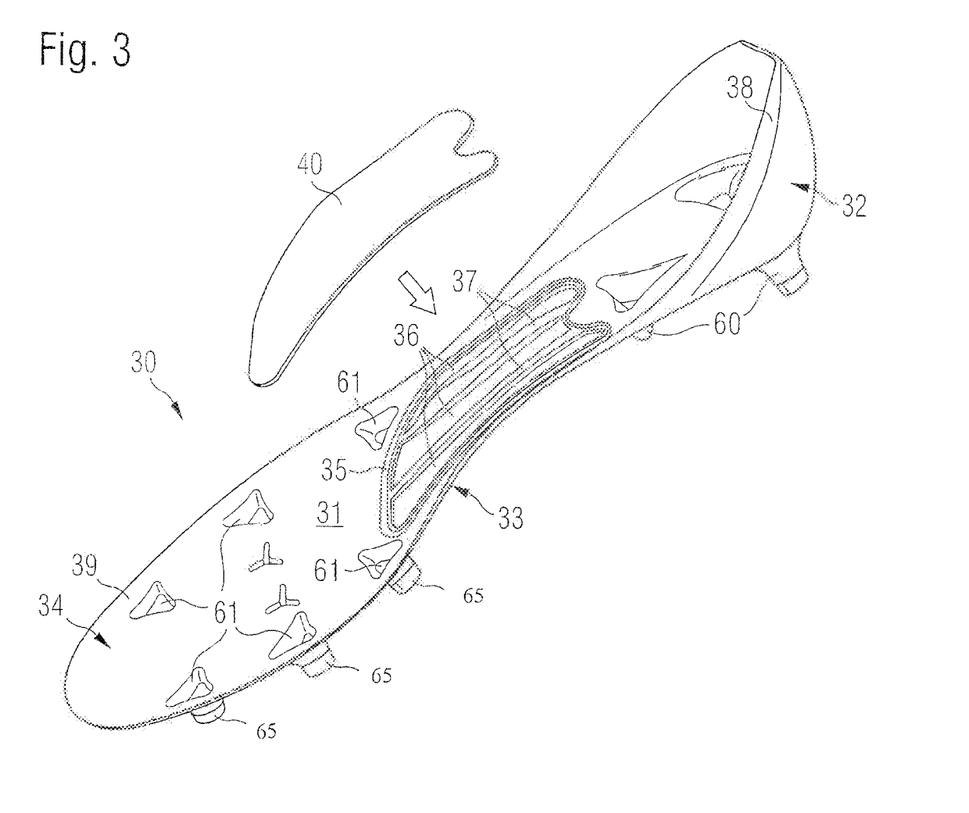
FIG. 3 is a schematic representation of an outsole according to an exemplary embodiment of the present invention.
Figure 4:
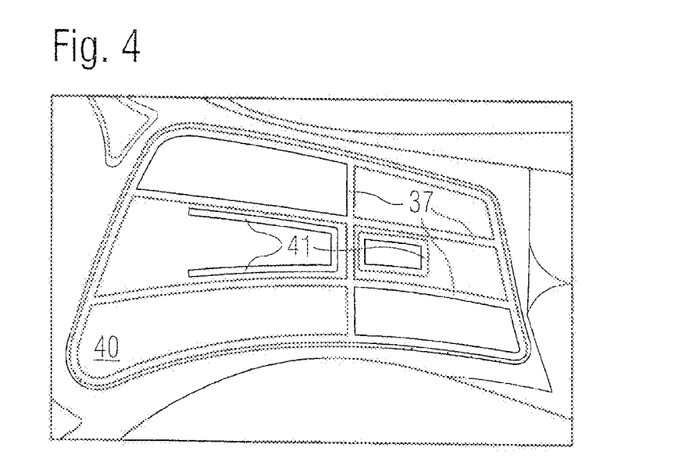
FIG. 4 is a top view of a transparent reinforcing plate according to an exemplary embodiment of the present invention.
Figure 5:
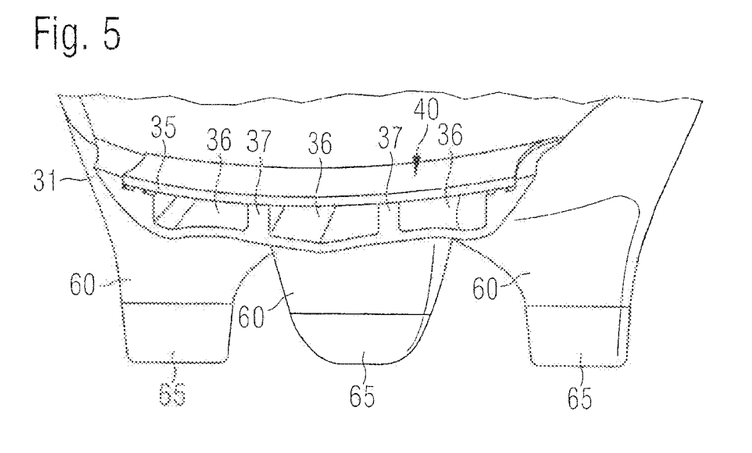
FIG. 5 is a schematic cross-section through the outsole of FIG. 3.

FIGS. 3, 4, 5, 7, and 8 illustrate a further aspect of exemplary embodiments of the present invention, i.e., the particularly lightweight but nevertheless highly stable outsole 30. As can be seen in FIG. 3, outsole 30 includes an integral sole plate 31 extending from a heel cup via a midfoot part 33 to a planar forefoot part 34. A recess 35 is arranged in midfoot part 33, including a plurality of reinforcing ribs 37 molded therein. While in the exemplary embodiment of FIGS. 3 and 5 two reinforcing ribs 37 extend in a longitudinal direction of sole plate 31, reinforcing ribs 37 may also extend in other directions. For example, the top view of the exemplary embodiment in FIG. 4 shows a transversely extending reinforcing rib 37 below a transparent reinforcing plate 40.

The shape, orientation, and number of reinforcing ribs 37 are selected to provide a high stiffness and breakage stability at low weight. In an exemplary embodiment of an outsole 30 for a soccer shoe, midfoot part 33 below the arch of a wearer's foot is appropriately stiffened. For other sports, according to exemplary embodiments of the present invention, other areas of integral sole plate 31 may be additionally or alternatively stiffened by one or more reinforcing ribs 37.

Reinforcing ribs 37 may include a thickness of a few millimeters (mm), possibly less than or equal to 3 mm. As a result, a very stiff midfoot part 33 can be provided if suitable plastic materials are used (e.g., a polyamide No. 12 (PA 12) reinforced with fibers). Wider and/or higher reinforcing ribs 37, however, may be used for other sports (e.g., basketball) due to higher expected loads. Furthermore, the shape of reinforcing ribs 37 may depend on the material used for sole plate 31. Both reinforcing plate 40 as well as sole plate 31 can be manufactured from a fiber-reinforced plastic material.

Sole plate 31 may be manufactured by injection-molding a suitable plastic material. This manufacturing method allows high production rate.

In order to further stiffen midfoot part 33, reinforcing plate 40 may be arranged on top of reinforcing ribs 37, and be arranged in recess 35 in such a manner that an essentially flat contact surface is provided for a wearer's foot on the top side. The term "essentially" in this context refers to configuring the height of reinforcing plate 40 such that the top side of reinforcing plate 40 aligns with the remaining top side of sole plate 31 so that local pressure points on the lower side of a wearer's foot in the transition region between sole plate 31 and reinforcing plate 40 are avoided. In contrast to a conventional sole assembly, there is no need to provide a midsole; the wearer's foot can directly contact the flat surface of sole plate 31 and reinforcing plate 40. For improving the wearing comfort, however, a thin inlay sole 50 may be arranged between the wearer's foot and the top surfaces of sole plate 31 and reinforcing plate 40.

In this case, the overall sole assembly includes sole plate 31, reinforcing plate 40, and inlay sole 50. An extremely low weight of outsole 30 and shoe 1 overall can be realized by this approach. If inlay sole 50 includes a plurality of perforations, the weight may be further reduced and at the same time, the ventilation of the foot may be improved.

Reinforcing plate 40 can be manufactured from the same or different material as sole plate 31. Potentially suitable materials include composite materials and polyamides (e.g., the polyamide sold under the trade name PEBAX®). If a rigid interconnection of reinforcing plate 40 with sole plate 31 is desired (it is not mandatory), known methods can be used to establish such rigid interconnection such as, for example, gluing or welding. For reasons of weight, but also for an effective manufacture, reinforcing plate 40 may have a sufficient transparency for laser radiation so that it can be welded to the subjacent material of sole plate 31 using a laser. This method avoids the weight of an additional adhesive as well as problems related to its processing (e.g., health risks and environmental problems due to the contained solvents). Reinforcing plate 40 may have a thickness of less than or equal to about 3 mm, and, in one embodiment, preferably less than or equal to about 1 mm.

The connection of reinforcing plate 40 to sole plate 31 is particularly rigid if reinforcing plate 40 includes on its lower side one or more reinforcing ribs 41 (see FIG. 4) leading to a positive fit in recess 35 and with reinforcing ribs 37. This is particularly the case if reinforcing ribs 37 and reinforcing ribs 41 are at least partially substantially parallel. Additional weight can be saved if sole plate 31 is formed so that one or more cavities 36 result between the sole plate 31 and the reinforcing plate 40 as shown in the sectional drawing of FIG. 5.

Figure 7:
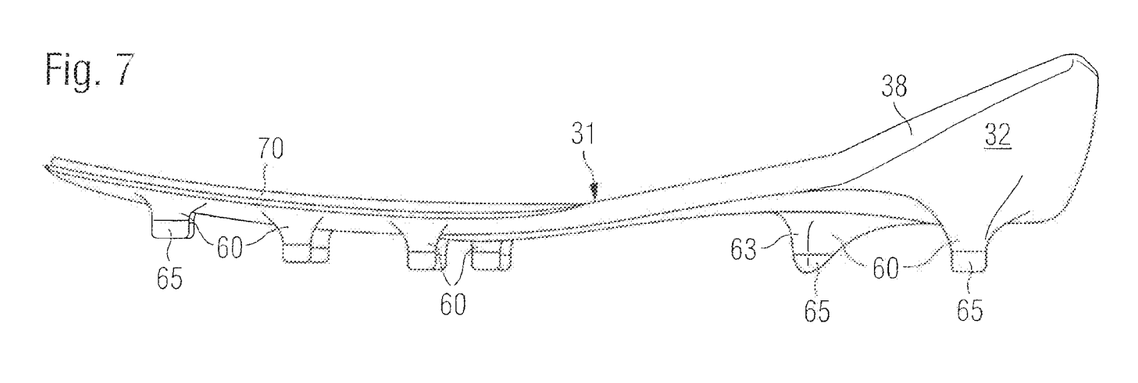
FIG. 7 is a schematic view of an outsole according to an exemplary embodiment of the present invention.
Figure 8:
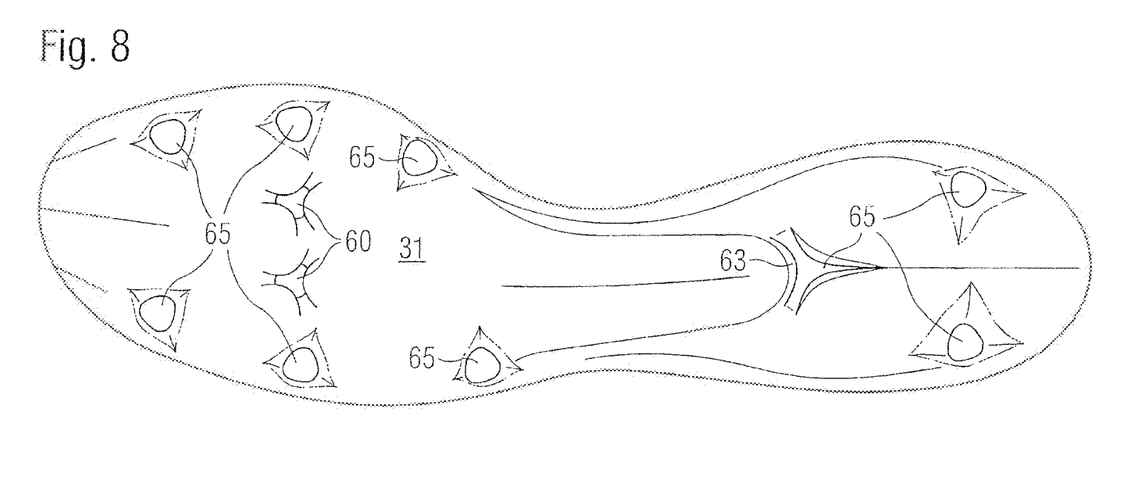
FIG. 8 is a bottom view of the outsole of FIG. 7.

For sports, such as, for example, soccer, that commonly impose high pressure loads in forefoot part 34, a further flat and lightweight insole 70 may be arranged in forefoot part 34 on top of sole plate 31 (see FIG. 7). Insole 70 evenly distributes the pressure loads onto a wearer's foot and avoids in particular point loads at profile elements 60, which are integral with sole plate 31 and explained further below. Moreover, insole 70 facilitates manufacturing of the shoe, since the upper material can be lasted to insole 70. Apart from an arrangement exclusively in the forefoot part, in other exemplary embodiments insole 70 may extend across the overall length of the shoe.

Insole 70 may be manufactured of a plastic material. In addition, insole 70 may have indentations or other intentional material weaknesses (not shown) in order to facilitate a rolling-off of the foot in forefoot part 34. For example, one or more line-shaped grooves may extend transversely in the plastic material from the lateral to the medial side of insole 70 or extend only over a part of insole 70. As a result, a sufficient flexibility is provided in forefoot part 34 together with an even pressure distribution. Moreover, insole 70 may have a thickened rounded edge (not shown), which avoids the material of upper 10 being damaged at strong lateral loads by the edge of insole 70.

An easy rolling-off with the forefoot is additionally facilitated in an exemplary embodiment by sole plate 31 and its essentially flat forefoot part 34. Only a small surrounding rim 39 projects by, for example, 1 to 2 mm to facilitate the arrangement of insole 70, inlay sole 50, and/or upper 10 on sole plate 31.

The heel cup is arranged in a heel part 32 of sole plate 31. The heel cup securely encompasses and guides a wearer's foot from the rear side without requiring any additional reinforcements of upper 10 in heel part 32, which further reduces the weight of shoe 1. The exact shape of the heel cup may depend on the intended field of use of shoe 1. For example, a basketball shoe may have a higher heel cup than a sprint shoe in order to provide the basketball shoe with a higher amount of stability when subjected to the expected loads. For a better wearing comfort, border regions 38 on the sides of the heel cup may be made of a softer plastic material. This feature avoids uncomfortable local pressure loads on the foot of a wearer, in particular given the thin and lightweight materials that may be used for upper 10. Using multi-component injection molding and adding a softer plastic material, such as, for example, TPU, sole plate 31 can be easily incorporated with other material (e.g., the above-mentioned PA 12) using an automated production process. Upper 10 could also directly be stitched (not shown) with the lateral edge of the heel cup, which would also result in saving material and reducing weight.

A further important aspect of exemplary embodiments of the present invention is the direct integration of a plurality of profile elements 60 into sole plate 31. Plastic materials that are suitable for the manufacturing of sole plate 31 also have a sufficient stability and wear resistance for profile elements 60. Complex and heavy attachment devices as they are conventionally used in soccer or sprint shoes are not necessary. This is a further aspect which contributes to reducing the overall weight of shoe 1.

As can be seen in FIGS. 1, 2, 3, 5, 7, and 8, there may be 11 profile elements 60 integrated in sole plate 31 in an exemplary embodiment of shoe 1. Eight profile elements 60 are arranged in the forefoot part 34 and three profile elements 60 are arranged in the heel part 32. The number of profile elements 60 as well as their dimension and shape depend on the field of use of shoe 1 and may therefore substantially vary from the embodiment shown in the Figures. The depicted arrangement minimizes the risk that grass, mud, etc. will stick beneath shoe 1 at the outsole, thus avoiding an increase of the weight of the shoe during use.

In the embodiment shown in the Figures, the foremost of the three profile elements 60 of heel part 32 has a particular shape. Here, an area 63 directed to the front is concavely curved to provide a strong deceleration in the ground. By this particular shape an additional stud at heel part 32 can be saved. Otherwise, profile elements 60 of the embodiment of the bottom view of FIG. 8 have a triangular shape with significantly rounded peaks. The (rounded) peaks of the four foremost studs in forefoot part 34 are directed to the front, so that the broad area of the studs can be used to sprint/accelerate. The two rear studs of forefoot part 34 and the studs of heel part 32 are directed with their broad side to the front, and therefore support the braking effect.

Particularly low weight of sole plate 31 and its integrated profile elements 60 is achieved if profile elements 60 are at least partly hollow. In the embodiment of FIG. 3, it can be seen that cavities 61 of profile element 60 are open to the top side. This facilitates removal from a mold during manufacture of sole plate 31 and integrated profile element 60 by injection molding. Cavities 61 may alternatively be closed in the interior of profile elements 60 if suitable manufacturing methods are used. Furthermore, profile elements 60 that are subject to special loads may be completely or partially made of massive plastic material. The manufacture of sole plate 31 by injection molding provides a high amount of design freedom.

If multi-component injection-molding is used it is possible to make only a part or a portion of profile elements 60 from a material other than the plastic materials of sole plate 31. For example in shoe 1 shown in the Figures, a softer plastic material such as TPU may be used to provide a portion 65 on six of the eight profile elements 60 of forefoot part 34 and on two of the three profile elements of heel part 32. Portions 65 can additionally be roughened or can be profiled. Providing such a portion 65 avoids a premature abrasion of subjacent profile element 60, which may be made of the plastic material of the sole plate 31. Furthermore, the somewhat softer TPU portions 65 improve the wearing comfort of shoe 1. An integral manufacture of portions 65 together with sole plate 31 is preferred. However, it is also possible to manufacture portions 65 independently from sole plate 31 and to subsequently attach them in a separate manufacturing step on profile elements 60 (e.g., by gluing, screwing, clipping, or also by insertion in a form and subsequent extrusion-coating).

What is claimed is:

1. A sole for an article of footwear, the sole comprising:
   a heel part and a forefoot part, connected by a midfoot part;
   a sole plate extending from the heel part to the forefoot part;
   at least one reinforcing rib integrated into the sole plate; and
   a reinforcing plate disposed above or below the at least one reinforcing rib,
   wherein the reinforcing plate comprises at least one member protruding from the reinforcement plate and extending toward the sole plate,
   wherein at least one cavity is disposed between the sole plate and the at least one reinforcing plate.

2. The sole of claim 1, wherein the at least one protruding member extends parallel to the at least one reinforcing rib.

3. The sole of claim 1, wherein the at least one protruding member comprises at least two protruding members, and
   wherein the at least two protruding members are disposed on opposing sides of the at least one reinforcing rib.

4. The sole of claim 1, wherein the at least one protruding member is a second reinforcing rib.

5. The sole of claim 1, wherein the reinforcing plate is rigidly connected to the sole plate by a positive fit between the at least one reinforcing rib and the at least one protruding member.

6. The sole of claim 1, wherein the at least one reinforcing rib comprises at least two reinforcing ribs,
   wherein the at least two reinforcing ribs are monolithic with each other and branch away from an intersection thereof, along a surface of the sole plate.

7. The sole of claim 1, wherein the at least one reinforcing rib has a thickness of less than or equal to about 5 mm.

8. The sole of claim 1, wherein the reinforcing plate has a thickness of less than or equal to about 3 mm.

9. The sole of claim 1, wherein the sole plate comprises a recess for receiving the reinforcing plate.

10. The sole of claim 9, wherein the height of the at least one reinforcing rib is less than or equal to the depth of the recess.

11. The sole of claim 9, wherein the recess is disposed within a boundary defined in the midfoot part.

12. The sole of claim 1, wherein the sole plate defines a surface throughout the forefoot part and the heel part, and comprises a recess from the surface in the midfoot part.

13. The sole of claim 1, wherein the reinforcing plate is welded to the sole plate.

14. The sole of claim 1, wherein the reinforcing plate is manufactured from a material with sufficient transparency with respect to a laser beam to allow interconnection to the sole plate by laser welding.

15. The sole of claim 1, wherein the at least one reinforcing rib extends in a longitudinal direction with respect to the sole.

16. The sole of claim 15, further comprising at least one reinforcing rib extending in a transversal direction with respect to the sole.

17. The sole of claim 1, wherein the sole plate forms at least part of an outsole of the sole, and wherein the sole plate comprises a plurality of integrally-formed hollow profile elements.

18. The sole of claim 1, wherein a heel portion of the sole plate comprises an integral heel cup.

19. An article of footwear comprising a sole, the sole comprising:
    a heel part and a forefoot part, connected by a midfoot part;
    a sole plate extending from the heel part to the forefoot part and defining a surface throughout the heel part and the forefoot part, wherein, in the midfoot part, the sole plate defines a recess from the surface;
    at least one reinforcing rib disposed in the recess and integrated into the sole plate;
    a reinforcing plate disposed above or below the at least one reinforcing rib, wherein the reinforcing plate comprises at least one member protruding from the reinforcement plate and extending toward the sole plate; and
    at least one cavity disposed between the sole plate and the reinforcing plate.

20. The article of footwear of claim 19, wherein the surface of the sole plate aligns with a top surface of the reinforcing plate to together form a surface for a wearer's foot.

21. A sole for an article of footwear, the sole comprising:
    a heel part and a forefoot part, connected by a midfoot part;
    a sole plate extending from the heel part to the forefoot part;
    at least two reinforcing ribs integrated into the sole plate; and
    a reinforcing plate disposed above or below the at least two reinforcing ribs,
    wherein the reinforcing plate comprises at least one member protruding from the reinforcement plate and extending toward the sole plate,
    wherein the at least two reinforcing ribs are monolithic with each other and branch away from an intersection thereof, along a surface of the sole plate.

22. A sole for an article of footwear, the sole comprising:
    a heel part and a forefoot part, connected by a midfoot part;
    a sole plate extending from the heel part to the forefoot part;
    a first reinforcing rib integrated into the sole plate;
    a second reinforcing rib integrated into the sole place; and
    a reinforcing plate disposed above or below the first or second reinforcing rib,
    wherein the reinforcing plate comprises at least one member protruding from the reinforcement plate and extending toward the sole plate,
    wherein the first reinforcing rib extends in a longitudinal direction with respect to the sole,
    wherein the second reinforcing rib extends in a transversal direction with respect to the sole.

* * * * *